United States Patent
Weisman et al.

(10) Patent No.: US 10,404,331 B2
(45) Date of Patent: Sep. 3, 2019

(54) PHASE-ROTATION OF SVD-BASED PRECODING MATRICES

(71) Applicant: Intel IP Corporation, Santa Clara, CA (US)

(72) Inventors: Tzahi Weisman, Mevaseret Tzion (IL); Shlomi Vituri, Tel-Aviv (IL); Assaf Gurevitz, Ramat HaSharon (IL)

(73) Assignee: Intel IP Corporation, Santa Clara, CA (US)

( * ) Notice: Subject to any disclaimer, the term of this patent is extended or adjusted under 35 U.S.C. 154(b) by 23 days.

(21) Appl. No.: 15/384,623

(22) Filed: Dec. 20, 2016

(65) Prior Publication Data
US 2018/0175918 A1    Jun. 21, 2018

(51) Int. Cl.
*H04B 7/04* (2017.01)
*H04B 7/06* (2006.01)
*H04B 7/0413* (2017.01)

(52) U.S. Cl.
CPC ................. *H04B 7/0413* (2013.01)

(58) Field of Classification Search
CPC .. H04B 7/0456; H04B 7/0634; H04B 7/0663; H04B 7/0682; H04B 7/0413
See application file for complete search history.

(56) References Cited

U.S. PATENT DOCUMENTS

| | | | |
|---|---|---|---|
| 7,088,671 B1 | 8/2006 | Monsen | |
| 2006/0188032 A1* | 8/2006 | Kim | H04L 1/06 375/260 |
| 2009/0190685 A1* | 7/2009 | Kimura | H04B 7/0404 375/267 |
| 2010/0278330 A1* | 11/2010 | Gernegross | H04M 3/18 379/417 |
| 2011/0274200 A1* | 11/2011 | Lee | H04L 25/03343 375/295 |
| 2012/0140851 A1* | 6/2012 | Zhang | H04B 7/0456 375/296 |
| 2013/0287069 A1* | 10/2013 | Su | H04B 7/0413 375/219 |
| 2015/0124897 A1* | 5/2015 | Phan Huy | H04L 5/0023 375/267 |
| 2016/0277083 A1 | 9/2016 | Koike-Akino et al. | |

OTHER PUBLICATIONS

Search Report dated Dec. 18, 2017 for International Application No. PCT/US2017/056383.

* cited by examiner

*Primary Examiner* — Romani Ohri
(74) *Attorney, Agent, or Firm* — Schiff Hardin LLP

(57) ABSTRACT

A wireless device configured to process Multiple-Input Multiple-Output (MIMO) data streams. The wireless device includes a Singular Value Decompostion (SVD) engine configured to diagonalize a channel matrix into a precoding matrix; an SVD rotation engine configured to phase-rotate the precoding matrix, such that the channel matrix is partially de-diagnalized; and a transmitter configured to transmit a data packet corresponding to the phase-rotated precoding matrix.

22 Claims, 3 Drawing Sheets

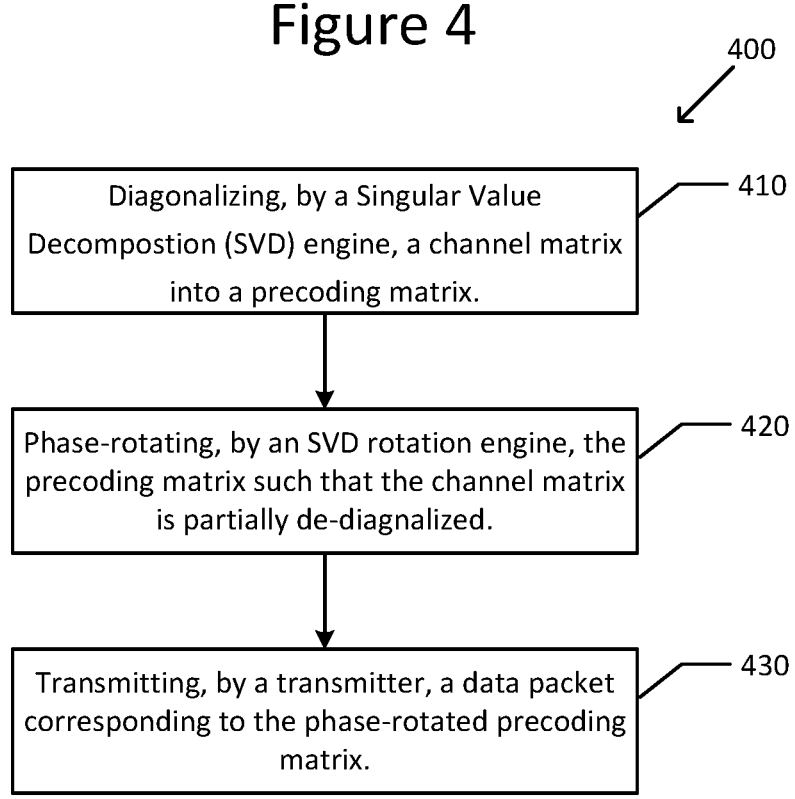

PHASE-ROTATION OF SVD-BASED PRECODING MATRICES

TECHNICAL FIELD

The present disclosure generally relates to Multiple-Input Multiple-Output (MIMO) beamforming, and more specifically, to phase-rotation of Singular Value Decomposition (SVD)-based precoding matrices.

BACKGROUND

When a transmitter employs SVD-based precoding matrices in a MIMO beamforming scheme, an equivalent received channel seen by a receiver is diagonal. In general, diagonality enhances receiver performance as Inter Stream Interference (ISI) is eliminated and the equivalent received Signal-to-Noise Ratio (SNR) increases.

However, when the channel's condition number, that is, the ratio between the largest and smallest eigenvalues, is high, full channel diagonalization accomplished by the SVD precoding procedure degrades performance because a received data stream associated with the lowest eigenvalue suffers from low SNR.

In many Institute of Electrical and Electronics Engineers (IEEE) 802.11 standards, the effect of channel condition number is emphasized due to different Modulation Coding Schemes (MCS) for each MIMO stream not being permitted; a single MCS must be used for all data streams. When the channel condition number is high, the transmitter's chosen MCS needs to be determined based on the smaller eigenvalue, and as a result data throughput decreases.

BRIEF DESCRIPTION OF THE DRAWINGS

FIG. 4 illustrates a flowchart of a method in accordance with an aspect of the disclosure.

DESCRIPTION OF THE ASPECTS

The present disclosure is directed to a wireless device configured to process MIMO data streams to improve MIMO beamforming performance. The wireless device comprises an SVD engine configured to diagonalize a channel matrix into a precoding matrix, and an SVD rotation engine configured to phase-rotate the precoding matrix such that an equivalent precoding matrix seen by another wireless device is partially de-diagonalized, thereby improving the quality of the wireless device's received signal.

Figure 1:
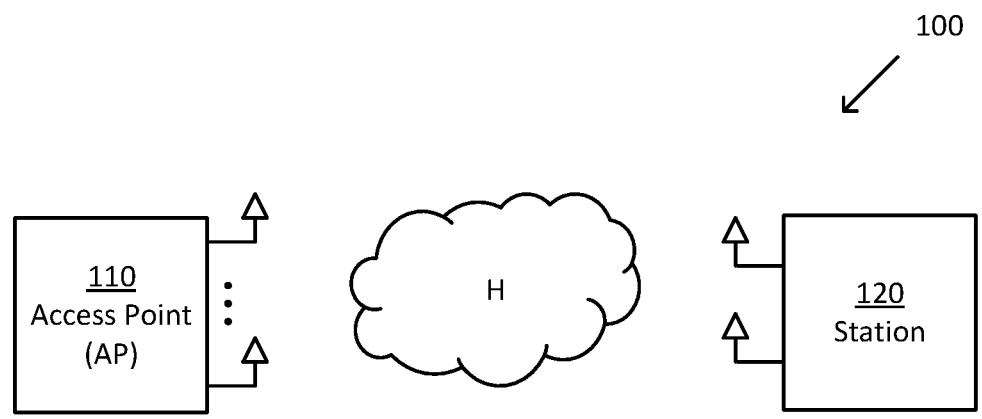
FIG. 1 illustrates a schematic diagram of a wireless communication system.

FIG. 1 illustrates a schematic diagram of a wireless communication system 100.

The wireless communication system comprises two wireless devices—an Access Point (AP) 110 and a station 120—communicating over a wireless channel. The AP 110 and the station 120 communicate with one another based on MIMO, which is a method for multiplying the capacity of a radio link over the communication channel using multiple transmit antennas and multiple receive antennas to exploit multipath propagation.

The AP 110 comprises two or more antennas. The station 120 in this example comprises two antennas, but the disclosure is not limited in this respect; the station 120 may comprise more than two antennas.

By way of background, MIMO communication involves beamforming, which is a signal processing technique used for directional signal transmission or reception. The wireless device with the greater or equal number of antennas generally performs the beamforming and may be referred to as the "beamformer", and the other wireless device may be referred to as the "beamformee". The beamformee creates a precoding matrix using SVD and then transmits a data packet corresponding to the precoding matrix to the beamformer. The beamformer then uses the precoding matrix to transmit a same data signal from each of its transmit antennas with appropriate weighting (phase and gain) such that signal power is maximized.

Figure 2:
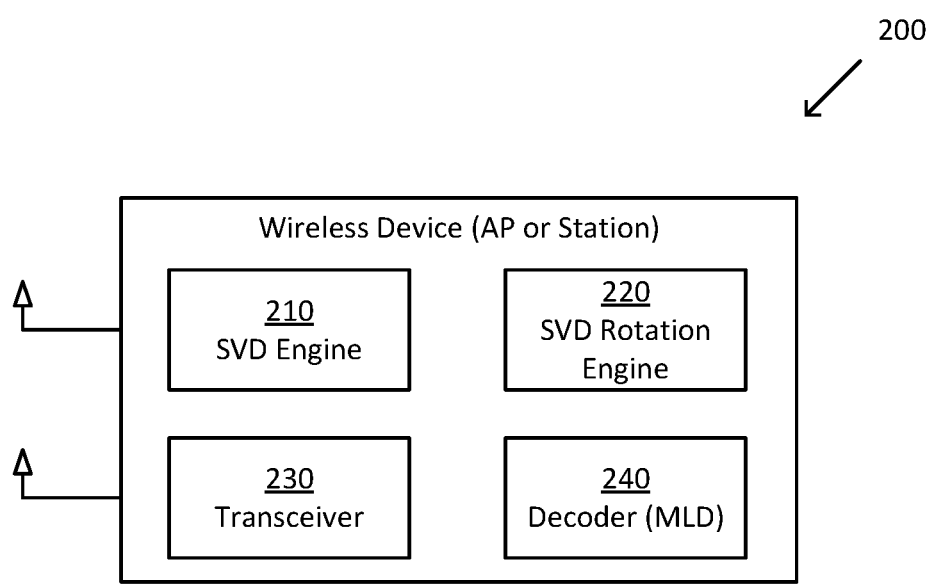
FIG. 2 illustrates a schematic diagram of a wireless device in accordance with an aspect of the disclosure.

FIG. 2 illustrates a schematic diagram of a wireless device 200 in accordance with an aspect of the disclosure.

The wireless device 200 comprises an SVD engine 210, an SVD rotation engine 220, a transceiver 230, and a decoder 240, among other elements. The wireless device 200 may be the AP 110, or alternatively, the station 120. In the description below, the wireless device 200 is described as being the station 120. Based on this description, one of ordinary skill would know how to adapt the description such that the wireless device 200 is the AP 110.

As described in detail below, the disclosure involves two steps. The first step is a computation of a diagonalizing precoding matrix V derived from the SVD. The second step is a rotation of the precoding matrix V into a rotated precoding matrix W using a unitary rotation matrix R.

First Step (Diagonalizing Precoding Matrix):

The SVD engine 210 is configured to decompose a channel matrix H into a precoding matrix V. SVD-based beamforming uses the SVD of the channel matrix, $H_{Nr \times Nt}$, HNrxNtin order to derive the precoding matrix $W_{N_t \times N_s}$ ($N_r$, $N_t$, and $N_s$ indicate the number of receive antennas, the number of transmit antennas, and the number of transmitted streams, respectively). The SVD decomposition of the channel matrix is $H = UDV^H$, where U is a $N_r N_r$ NrxNr unitary matrix, D is a NrxNr diagonal matrix, with $D_{ii} = \lambda_i$ Dii=λi is a i'th Singular Value, and $V^H$ VH being the NrxNt row orthonormal matrix.

The AP 110 (i.e., beamformer) then uses the first $N_s$ columns as the precoding matrix, i.e., $W = V_{1:N_t, 1:N_s}$ W=V1:Nt,1:Ns. Then, the station 120 receives a signal y=HWs+n, y=HWs+n where $s = [s_1, s_2, \ldots s_{N_s}]^T$ s=s1, s2, ..., SNsT is the data streams vector, and n is the Added White Gaussian Noise (AWGN).

The equivalent channel seen by the station 120 may be represented as $U^H H W = D$, which is a diagonal channel.

Second Step (Phase Rotation):

In some cases a conditional number of the channel is high. This means that a ratio between the highest and the lowest singular value is high, and the data stream associated with the weakest singular value suffers from a low SNR. As a single MCS (Modulation+code rate) is chosen for all of the data streams, this weaker data stream determines the MCS, thereby degrading performance.

When the station 120 (i.e., beamformee) has an MLD 240, the high condition number problem may be mitigated by applying quazi-diagonalization to the channel rather than a full diagonalization. This quazi-diagonalization controls the amount of ISI such that the MLD 240 sees in each receive antenna a combination of the data streams, thereby increasing the total SNR. The quazi-diagonalization operation may be regarded as matching the ISI level to optimize the MLD 240 performance.

The SVD rotation engine 220 is configured to phase-rotate the precoding matrix V such that the channel matrix H is partially diagonalized, that is, not fully diagonalized as it was in the first step described above. The phase rotation of the precoding matrix V may be performed by the wireless device performing the transmitting, that is, by the AP 110 or beamformer, according to reported SNR and MCS. Alternatively, the phase rotation of the precoding matrix V may be performed by the wireless device performing the receiving, that is, the station 120 or beamformee, prior to transmitting a data packet corresponding to the rotated precoding matrix W back to the beamformer. Inter-Symbol Interference (ISI) is reduces, but some does remain. The MLD 240 exploits this fact and there results in a gain in performance.

When applying a simple phase rotation to a precoding matrix V and using an MLD 240 at the station 200, the station 200's sensitivity improves. This improvement is due to the fact the IEEE 802.11ac standard, for example, states that a single Modulation Coding Scheme (MCS) is to be used for the data streams. The rotation of the SVD matrix V, which mixes received the data streams, enables the MLD 240 to see both data streams, even for a highly correlated channel.

This quazi-diagonalization step (i.e., rotation step) is performed using a unitary $N_s \times N_s$ Ns×Ns rotation matrix. In the case of two MIMO data streams, the rotation matrix, R, R, is controlled by a single parameter:

$$R = \begin{bmatrix} \cos(\theta) & \sin(\theta) \\ -\sin(\theta) & \cos(\theta) \end{bmatrix} = \begin{bmatrix} \sqrt{(1-\alpha^2)} & \alpha \\ -\alpha & \sqrt{(1-\alpha^2)} \end{bmatrix}, \quad \text{(Equation 1)}$$

where θ is an angle of rotation of the precoding matrix, and α is a rotation coefficient. The rotation coefficient α is based on an encoding rate of the MIMO data streams. If the rotation coefficient α is zero, the SVD rotation engine 220 is configured to bypass the phase-rotation of the precoding matrix V.

The rotated precoding matrix is calculated as W=V·R W=V·R.

With this rotation, with two MIMO data streams, the SVD rotation engine 220 is configured to phase-rotate the precoding matrix by multiplying the first and second MIMO data streams with a unitary rotation matrix as represented as follows:

$$R \cdot \begin{bmatrix} s_1 \\ s_2 \end{bmatrix} = \begin{bmatrix} \sqrt{(1-\alpha^2)} s_1 + \alpha s_2 \\ -\alpha s_1 + \sqrt{(1-\alpha^2)} s_2 \end{bmatrix}, \quad \text{(Equation 2)}$$

where R is the unitary rotation matrix, α is a rotation coefficient, $s_1$ is the first MIMO data stream, and $s_2$ is the second MIMO data stream. The first receive antenna sees the first line of the matrix, with the second data stream $s_2$ being interference. Similarly, the second receive antenna sees the second line of the matrix, with the first data stream $s_1$ being interference. Each of the lines is a mixture of both the first data stream $S_1$ and the second data stream $S_2$. When α=0, α=0 the rotation degenerates such that the decoder 240 sees the two original diagonalized streams $s_1$ and $s_2$, namely, $$\begin{bmatrix} s_1 \\ s_2 \end{bmatrix}.$$

The two lines of the matrix are the two inputs to the decoder 240.

The new precoding matrix W maintains the orthogonality of the precoding matrix V, that is, $W^H W = R^H V^H V R = R^H R = I$, as the rotation matrix R is unitary matrix as well.

Figure 3:
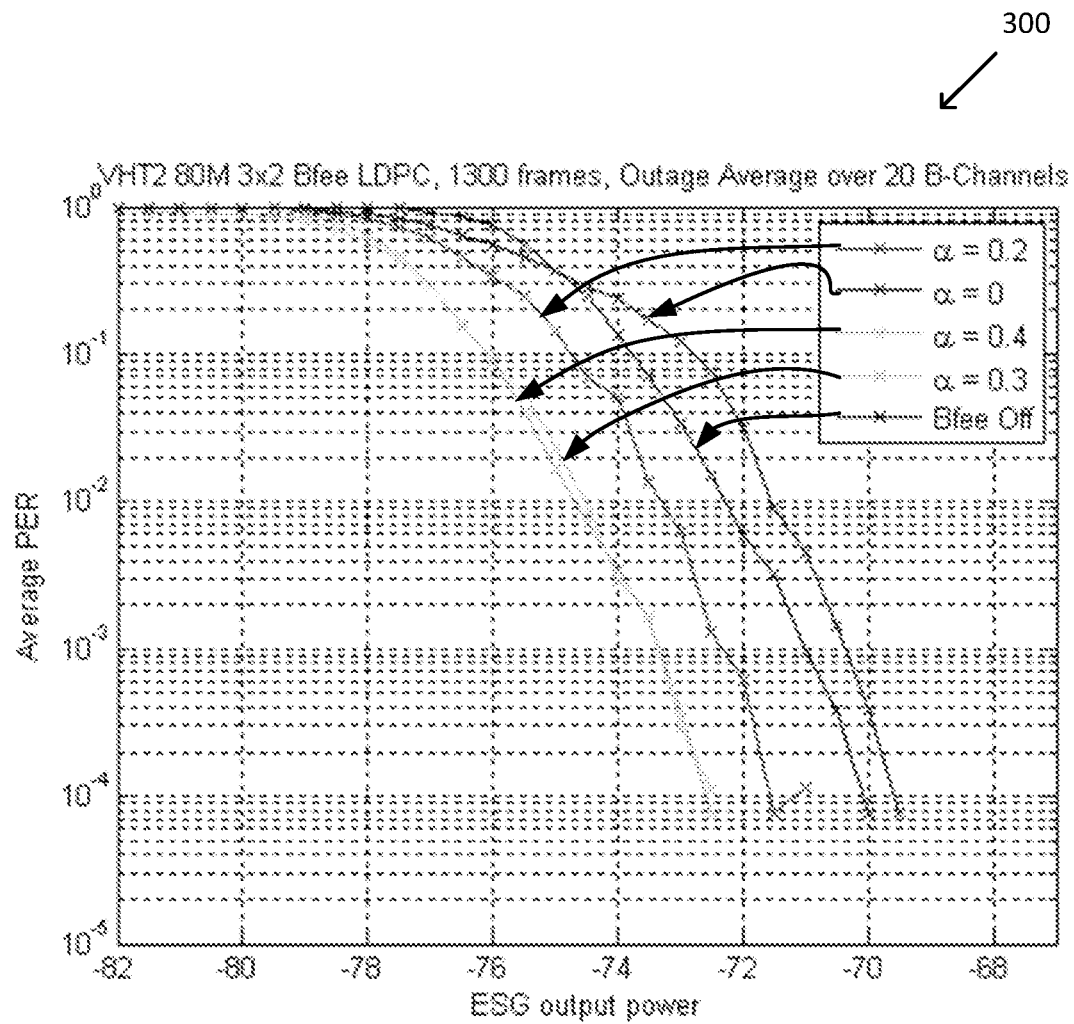
FIG. 3 illustrates a graph of Packet Error Rate (PER) versus transmitted signal power.

FIG. 3 illustrates a graph 300 of Packet Error Rate (PER) versus transmitted signal power, in dBm, for various rotation coefficients at a Quadrature Phase Shift Keying (QPSK) rate 3/4 modulation. The AP 110 uses three transmit antennas to transmit two MIMO data streams to the station 120, which in this example comprises two receive antennas. The graph 300 depicts several curves for different value of a rotation coefficient, α. Also, the non-beamforming curve is also given for reference. It can be seen that when using α=0.3, the sensitivity gain is approximately 3 dB in comparison with the original precoding matrix V, that is, with α=0.

FIG. 4 illustrates a flowchart 400 of a method in accordance with an aspect of the disclosure.

In Step 410, the SVD engine 210 diagonalizes the channel matrix H into a precoding matrix V.

In Step 420, the SVD rotation engine 220 phase-rotates the precoding matrix V such that an equivalent precoding matrix seen by another wireless device is partially de-diagonalized.

In Step 430, the transmitter transmits a data packet corresponding to the phase-rotated precoding matrix W.

For the purposes of this discussion, the term "engine" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein. In one or more of the exemplary aspects described herein, an engine can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

The following examples pertain to further embodiments.

Example 1 is a wireless device configured to process Multiple-Input Multiple-Output (MIMO) data streams, the wireless device comprising: a Singular Value Decompostion (SVD) engine configured to diagonalize a channel matrix into a precoding matrix; an SVD rotation engine configured to phase-rotate the precoding matrix, such that an equivalent precoding matrix seen by another wireless device is partially de-diagonalized; and a transmitter configured to transmit to the other wireless device a data packet corresponding to the phase-rotated precoding matrix.

In Example 2, the subject matter of Example 1, wherein the SVD rotation engine is configured to phase-rotate the precoding matrix by multiplying the precoding matrix by a unitary rotation matrix.

In Example 3, the subject matter of Example 2, wherein the unitary rotation matrix is represented as $$R = \begin{bmatrix} \cos(\theta) & \sin(\theta) \\ -\sin(\theta) & \cos(\theta) \end{bmatrix} = \begin{bmatrix} \sqrt{(1-\alpha^2)} & \alpha \\ -\alpha & \sqrt{(1-\alpha^2)} \end{bmatrix},$$

where θ is an angle of rotation of the precoding matrix, and α is a rotation coefficient.

In Example 4, the subject matter of Example 3, wherein the rotation coefficient α is based on an encoding rate of the MIMO data streams.

In Example 5, the subject matter of Example 2, wherein: the MIMO data streams comprise first and second MIMO data streams, and the SVD rotation engine is configured to phase-rotate the precoding matrix by multiplying the first and second MIMO data streams with a unitary rotation matrix as represented as follows:

$$R \cdot \begin{bmatrix} s_1 \\ s_2 \end{bmatrix} = \begin{bmatrix} \sqrt{(1-\alpha^2)}\, s_1 + \alpha s_2 \\ -\alpha s_1 + \sqrt{(1-\alpha^2)}\, s_2 \end{bmatrix},$$

where R is the unitary rotation matrix, α is a rotation coefficient, $s_1$ is the first MIMO data stream, and $s_2$ is the second MIMO data stream.

In Example 6, the subject matter of Example 2, further comprising: a decoder configured to decode the phase-rotated precoding matrix.

In Example 7, the subject matter of Example 6, wherein the decoder is configured to decode based on Maximum Likelihood Decoding (MLD).

In Example 8, the subject matter of Example 6, wherein the data streams are decoded based on a same Modulation Coding Scheme (MCS).

In Example 9, the subject matter of Example 1, wherein the wireless device is an Access Point (AP).

In Example 10, the subject matter of Example 1, wherein the wireless device is a station.

Example 11 is a method of processing Multiple-Input Multiple-Output (MIMO) data streams by a wireless device, the method comprising: diagonalizing, by a Singular Value Decompostion (SVD) engine, a channel matrix into a precoding matrix; phase-rotating, by an SVD rotation engine, the precoding matrix such that an equivalent precoding matrix seen by another wireless device is partially de-diagonalized; and transmitting, by a transmitter, to the other wireless device a data packet corresponding to the phase-rotated precoding matrix.

In Example 12, the subject matter of Example 11, wherein the phase-rotating the precoding matrix comprises: multiplying the precoding matrix by a unitary rotation matrix.

In Example 13, the subject matter of Example 12, wherein the unitary rotation matrix is represented as:

$$R = \begin{bmatrix} \cos(\theta) & \sin(\theta) \\ -\sin(\theta) & \cos(\theta) \end{bmatrix} = \begin{bmatrix} \sqrt{(1-\alpha^2)} & \alpha \\ -\alpha & \sqrt{(1-\alpha^2)} \end{bmatrix},$$

where θ is an angle of rotation of the precoding matrix, and α is a rotation coefficient.

In Example 14, the subject matter of Example 13, wherein the rotation coefficient α is based on an encoding rate of the MIMO data streams.

In Example 15, the subject matter of Example 12, wherein: the MIMO data streams comprise first and second MIMO data streams, and the multiplying the first and second MIMO data streams with a unitary rotation matrix is represented as follows:

$$R \cdot \begin{bmatrix} s_1 \\ s_2 \end{bmatrix} = \begin{bmatrix} \sqrt{(1-\alpha^2)}\, s_1 + \alpha s_2 \\ -\alpha s_1 + \sqrt{(1-\alpha^2)}\, s_2 \end{bmatrix},$$

where R is the unitary rotation matrix, α is a rotation coefficient, $s_1$ is the first MIMO data stream, and $s_2$ is the second MIMO data stream.

In Example 16, the subject matter of Example 11, further comprising: decoding, by a decoder, the phase-rotated precoding matrix.

In Example 17, the subject matter of Example 16, wherein the decoding comprises Maximum Likelihood Decoding (MLD).

In Example 18, the subject matter of Example 16, wherein the data streams are decoded based on a same Modulation Coding Scheme (MCS).

In Example 19, the subject matter of Example 11, wherein the wireless device is an Access Point (AP).

In Example 20, the subject matter of Example 11, wherein the wireless device is a station.

Example 21 is an apparatus for wireless communications adapted to process Multiple-Input Multiple-Output (MIMO) data streams, the wireless device comprising: a Singular Value Decompostion (SVD) means for diagonalizing a channel matrix into a precoding matrix; an SVD rotation means for phase-rotating the precoding matrix, such that an equivalent precoding matrix seen by another wireless device is partially de-diagonalized; and an interfacing means for outputting to the other wireless device a data packet corresponding to the phase-rotated precoding matrix.

In Example 22, the subject matter of Example 21, wherein the SVD rotation means is further for phase-rotating the precoding matrix by multiplying the precoding matrix by a unitary rotation matrix.

In Example 23, the subject matter of Example 22, wherein the unitary rotation matrix is represented as:

$$R = \begin{bmatrix} \cos(\theta) & \sin(\theta) \\ -\sin(\theta) & \cos(\theta) \end{bmatrix} = \begin{bmatrix} \sqrt{(1-\alpha^2)} & \alpha \\ -\alpha & \sqrt{(1-\alpha^2)} \end{bmatrix},$$

where θ is an angle of rotation of the precoding matrix, and α is a rotation coefficient.

In Example 24, the subject matter of Example 23, wherein the rotation coefficient α is based on an encoding rate of the MIMO data streams.

In Example 25, the subject matter of Example 22, wherein: the MIMO data streams comprise first and second MIMO data streams, and the SVD rotation means is further for phase-rotating the precoding matrix by multiplying the first and second MIMO data streams with a unitary rotation matrix as represented as follows:

$$R \cdot \begin{bmatrix} s_1 \\ s_2 \end{bmatrix} = \begin{bmatrix} \sqrt{(1-\alpha^2)}\, s_1 + \alpha s_2 \\ -\alpha s_1 + \sqrt{(1-\alpha^2)}\, s_2 \end{bmatrix},$$

where R is the unitary rotation matrix, α is a rotation coefficient, $s_1$ is the first MIMO data stream, and $s_2$ is the second MIMO data stream.

In Example 26, the subject matter of Example 22, further comprising: a decoding means for decoding the phase-rotated precoding matrix.

In Example 27, the subject matter of Example 26, wherein the decoding means is further for decoding based on Maximum Likelihood Decoding (MLD).

In Example 28, the subject matter of Example 26, wherein the data streams are decoded based on a same Modulation Coding Scheme (MCS).

In Example 29, the subject matter of Example 21, wherein the wireless device is an Access Point (AP).

In Example 30, the subject matter of Example 21, wherein the wireless device is a station.

Example 31 is an apparatus substantially as shown and described.

Example 32 is a method substantially as shown and described.

While the foregoing has been described in conjunction with an exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A wireless device having a first plurality of antennas, the wireless device configured to process Multiple-Input Multiple-Output (MIMO) data streams, the wireless device comprising:
   a Singular Value Decompostion (SVD) engine configured to diagonalize a channel matrix into a precoding matrix;
   an SVD rotation engine configured to phase-rotate the precoding matrix by applying a partial diagonalization to the precoding matrix to generate a phase-rotated precoding matrix such that a portion of an equivalent precoding matrix from a perspective of a second wireless device is de-diagonalized; and
   a transmitter configured to transmit, to the second wireless device, a data packet corresponding to the phase-rotated precoding matrix,
   wherein the partial diagonalization applied to the precoding matrix via the SVD rotation engine results in a combination of the MIMO data streams being received at each of a second plurality of antennas associated with the second wireless device.

2. The wireless device of claim 1, wherein the SVD rotation engine is configured to phase-rotate the precoding matrix by multiplying the precoding matrix by a unitary rotation matrix.

3. The wireless device of claim 2, wherein the unitary rotation matrix is represented as $$R = \begin{bmatrix} \cos(\theta) & \sin(\theta) \\ -\sin(\theta) & \cos(\theta) \end{bmatrix} = \begin{bmatrix} \sqrt{(1-\alpha^2)} & \alpha \\ -\alpha & \sqrt{(1-\alpha^2)} \end{bmatrix},$$

where θ is an angle of rotation of the precoding matrix, and a is a rotation coefficient.

4. The wireless device of claim 3, wherein the rotation coefficient α is based on an encoding rate of the MIMO data streams.

5. The wireless device of claim 2, wherein:
   the MIMO data streams comprise first and second MIMO data streams, and
   the SVD rotation engine is configured to phase-rotate the precoding matrix by multiplying the first and second MIMO data streams with a unitary rotation matrix as represented as follows:

$$R \cdot \begin{bmatrix} s_1 \\ s_2 \end{bmatrix} = \begin{bmatrix} \sqrt{(1-\alpha^2)}\, s_1 + \alpha s_2 \\ -\alpha s_1 + \sqrt{(1-\alpha^2)}\, s_2 \end{bmatrix},$$

where R is the unitary rotation matrix, a is a rotation coefficient, $s_1$ is the first MIMO data stream, and $s_2$ is the second MIMO data stream.

6. The wireless device of claim 2, further comprising:
   a decoder configured to decode the phase-rotated precoding matrix.

7. The wireless device of claim 6, wherein the decoder is configured to decode based on Maximum Likelihood Decoding (MLD).

8. The wireless device of claim 6, wherein the data streams are decoded based on a same Modulation Coding Scheme (MCS).

9. The wireless device of claim 1, wherein the wireless device is an Access Point (AP).

10. The wireless device of claim 1, wherein the wireless device is a station.

11. The wireless device of claim 1, wherein the partial diagonalization of the precoding matrix applied via the SVD rotation engine controls an amount of Inter Stream Interference (ISI) received at each of the second plurality of antennas associated with the second wireless device.

12. The wireless device of claim 1, wherein the combination of the MIMO data streams received at each of the second plurality of antennas associated with the second wireless device results in an increase in a total signal-to-noise (SNR) ratio of a signal associated with the MIMO data streams compared to the precoding matrix being fully diagonalized.

13. A method of processing Multiple-Input Multiple-Output (MIMO) data streams by a wireless device having a first plurality of antennas, the method comprising:
   diagonalizing, by a Singular Value Decompostion (SVD) engine, a channel matrix into a precoding matrix;
   phase-rotating, by an SVD rotation engine, the precoding matrix by applying a partial diagonalization to the precoding matrix to generate a phase-rotated precoding matrix such that a portion of an equivalent precoding matrix from a perspective of a second wireless device is de-diagonalized;
   and
   transmitting, by a transmitter, to the second wireless device a data packet corresponding to the phase-rotated precoding matrix,
   wherein the partial diagonalization applied to the precoding matrix via the SVD rotation engine results in a combination of the MIMO data streams being received at each of a second plurality of antennas associated with the second wireless device.

14. The method of claim 13, wherein the phase-rotating the precoding matrix comprises:
multiplying the precoding matrix by a unitary rotation matrix.

15. The method of claim 14, wherein the unitary rotation matrix is represented as $$R = \begin{bmatrix} \cos(\theta) & \sin(\theta) \\ -\sin(\theta) & \cos(\theta) \end{bmatrix} = \begin{bmatrix} \sqrt{(1-\alpha^2)} & \alpha \\ -\alpha & \sqrt{(1-\alpha^2)} \end{bmatrix},$$

where $\theta$ is an angle of rotation of the precoding matrix, and $\alpha$ is a rotation coefficient.

16. The method of claim 15, wherein the rotation coefficient $\alpha$ is based on an encoding rate of the MIMO data streams.

17. The method of claim 14, wherein:
the MIMO data streams comprise first and second MIMO data streams, and
the multiplying the first and second MIMO data streams with a unitary rotation matrix is represented as follows:

$$R \cdot \begin{bmatrix} s_1 \\ s_2 \end{bmatrix} = \begin{bmatrix} \sqrt{(1-\alpha^2)}\, s_1 + \alpha s_2 \\ -\alpha s_1 + \sqrt{(1-\alpha^2)}\, s_2 \end{bmatrix},$$

where R is the unitary rotation matrix, a is a rotation coefficient, $s_1$ is the first MIMO data stream, and $s_2$ is the second MIMO data stream.

18. The method of claim 13, further comprising:
decoding, by a decoder, the phase-rotated precoding matrix.

19. The method of claim 18, wherein the decoding comprises Maximum Likelihood Decoding (MLD).

20. The method of claim 18, wherein the data streams are decoded based on a same Modulation Coding Scheme (MCS).

21. The method of claim 13, wherein the wireless device is an Access Point (AP).

22. The method of claim 13, wherein the wireless device is a station.

* * * * *